Dec. 13, 1949  C. E. ELLIS  2,490,789
TORQUE CONVERTER
Filed May 2, 1945  5 Sheets-Sheet 1
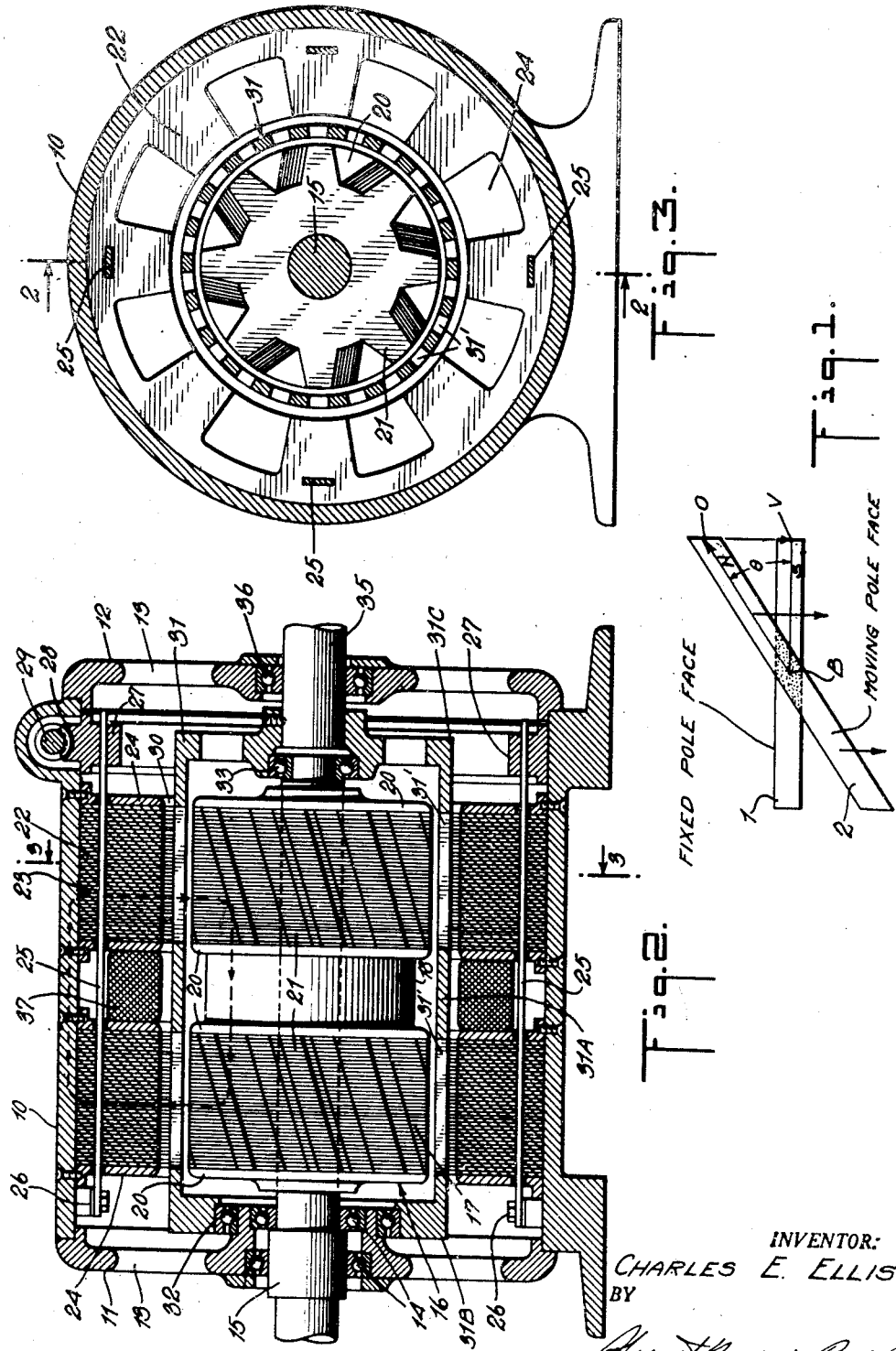
INVENTOR:
CHARLES E. ELLIS
BY
ATTORNEYS Dec. 13, 1949          C. E. ELLIS          2,490,789
TORQUE CONVERTER Filed May 2, 1945          5 Sheets-Sheet 2

INVENTOR:
CHARLES E. ELLIS
BY
ATTORNEYS

Dec. 13, 1949     C. E. ELLIS     2,490,789
TORQUE CONVERTER

Filed May 2, 1945     5 Sheets-Sheet 3

INVENTOR:
CHARLES E. ELLIS
BY
ATTORNEYS

Dec. 13, 1949  C. E. ELLIS  2,490,789
TORQUE CONVERTER
Filed May 2, 1945  5 Sheets-Sheet 4
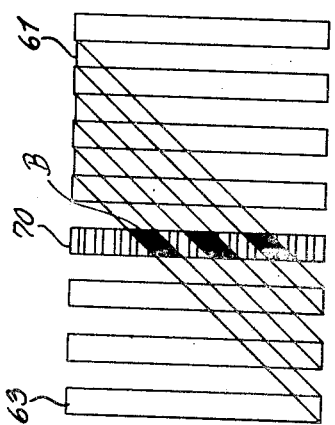
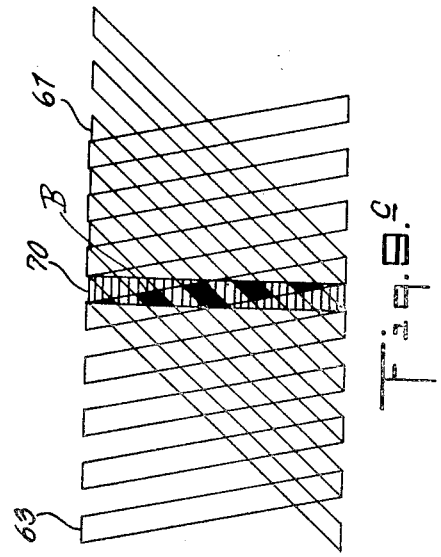
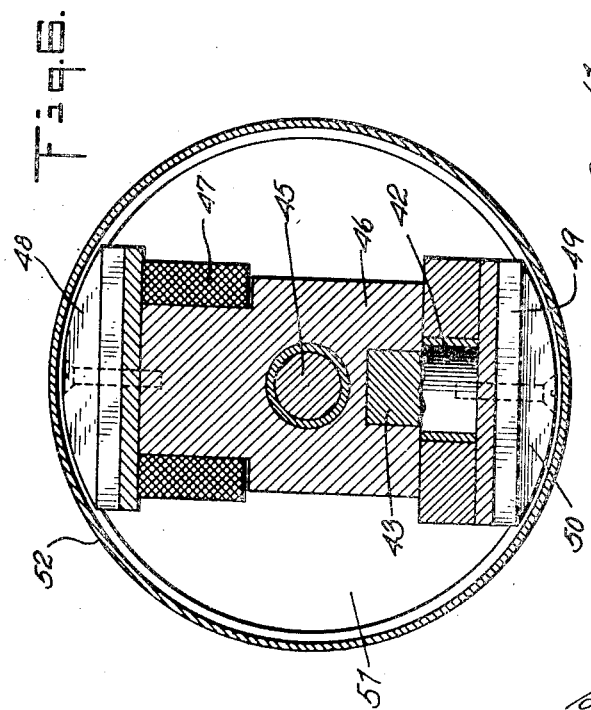
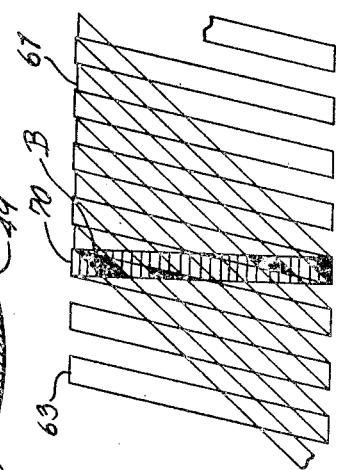
INVENTOR:
CHARLES E. ELLIS
BY
ATTORNEYS

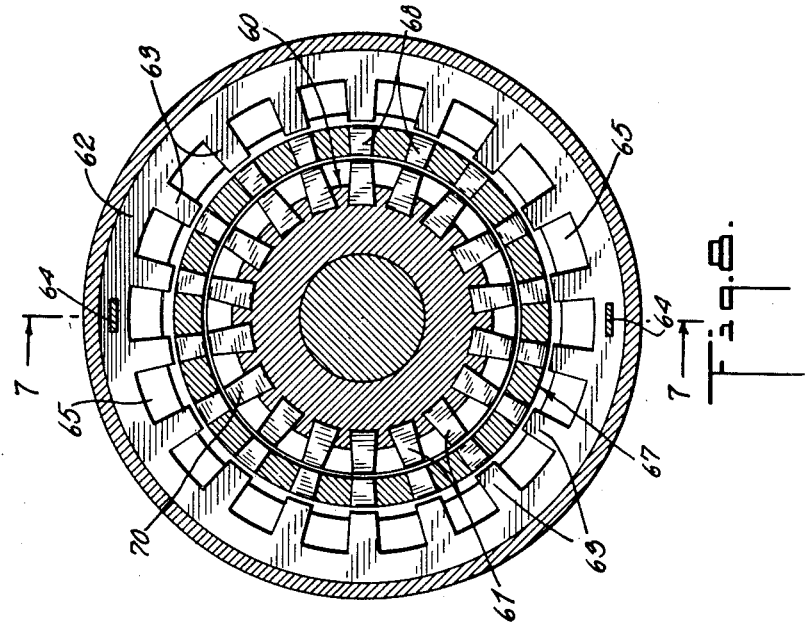
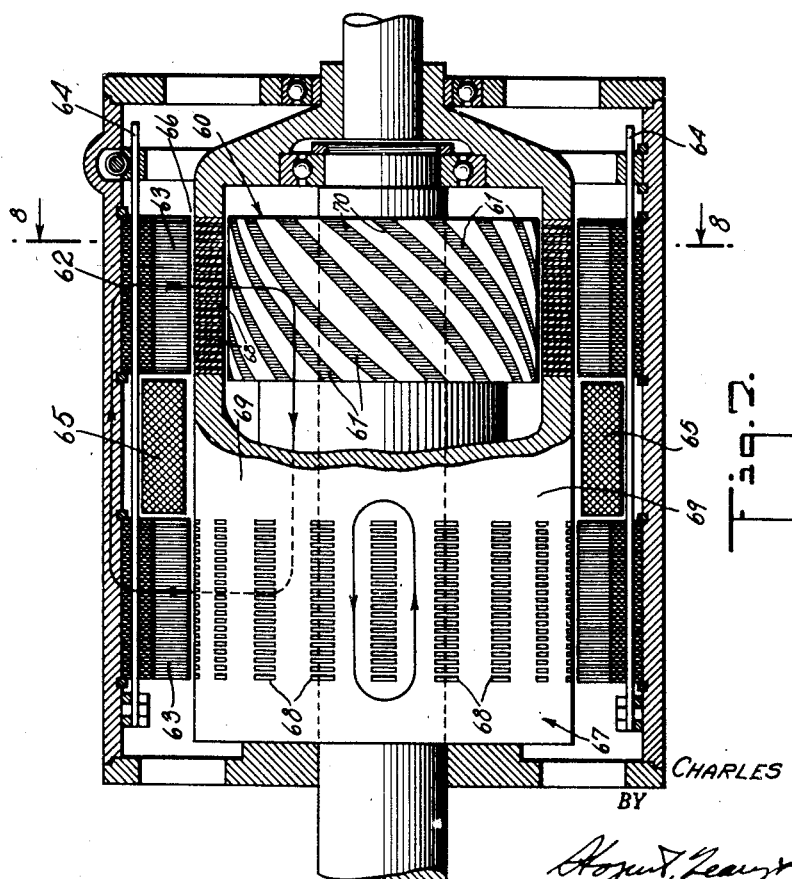

Patented Dec. 13, 1949

2,490,789

UNITED STATES PATENT OFFICE 2,490,789

TORQUE CONVERTER

Charles E. Ellis, Mahwah, N. J.

Application May 2, 1945, Serial No. 591,567

20 Claims. (Cl. 172—284)

1

This invention relates to torque converters, and has particular reference to an electromechanical device for converting a mechanical motion at a certain speed and force into a motion of different speed or direction and force.

The invention concerns the discovery of the magnetic principle that movement of one elongated magnetic pole face linearly across and in closely-spaced relation to another oppositely magnetized, elongated pole face, but at an angle thereto, will cause magnetic flux lines to exist and be concentrated into a "bundle" in the air gap at the point where the poles cross, which moves in accordance with the relative movements between the pole faces and which drives an interposed element responsive to the drag of the moving flux bundle. By varying the angular relation between the opposed pole faces, the speed of movement of the flux bundle and consequently of the driven element will likewise vary without increase in the absolute relative physical movement between the pole faces. By increasing the number of crossing magnetic pole faces on the relatively movable member, the number of flux bundles is correspondingly increased with consequent increase of the force on the interposed driven member, and, by simultaneously varying the angular relation between the pole faces of one member relatively to those of the other member, the magnitude of force and speed may be simultaneously varied at will within wide limits, thus effecting a range of force conversion.

In one adaptation of the principle of this invention to a rotary torque converter, the relatively movable magnetic elements or bars constitute the stator and the rotor, the latter being mounted on a shaft in such a way that each magnetic bar is inclined to the axial plane so that the rotor bars are permanently skewed spirally. The stator is composed of similar magnetic elements or bars arranged in a tubular frame and lying substantially parallel to the rotor axis with an air gap between the stator and rotor bars, with the stator bars skewable at will spirally around the axis by means of a skewing lever, whereby the aforementioned variable angular relation between the relatively movable stator and rotor magnetic elements or bars may be achieved. The stator is preferably divided axially into two sections and a ring-shaped field coil disposed between them for establishing a steady magnetic field through the stator and rotor generally parallel to the longitudinal axis of the bars, i. e. substantially in axial planes, and which magnetic field crosses the air gaps between the two pole structures in a sub-

2 stantially radial direction. Rotatably interposed in the air gap between the magnetic stator and rotor is a cylindrical driven member which may be considered an "armature," although it is nonmagnetic, being formed of copper, aluminum, or the like, preferably substantially divided by elongated axial slots into bars corresponding generally to the stator and rotor bars, or the armature may be formed of spaced copper bars arranged parallel to the axis. Relative rotation between the relatively skewed rotor and stator magnetic bars causes the bundles of flux traversing the air gap and armature to move in spiral paths, with a corresponding rotational motion component, the magnitude of which depends upon the degree of relative skew of the stator elements. The spiral flux bundle movement generates eddy currents in the armature conductors which give rise to electromagnetic forces tending to resist the flux bundle motion which creates them, thus causing the copper armature to rotate almost in step with the rotational component, the torque and speed of the armature relatively to the torque and speed of the driven rotor being regulated at will by adjusting the angle of skew of the stator elements as described.

In another adaptation of the principle of the invention, the skewing adjustment of the relatively moving magnetic elements is accomplished by bodily skewing the rotor, with the complementary surfaces of the stator or the rotor and the interposed non-magnetic armature being shaped as elements of concentric spheres to maintain a fixed air gap.

In both of the above-described adaptations of the principle of the invention to rotary torque converters, the interreaction of magnetic forces causing rotation of the armature is the result of slip between the rotary motion of the flux bundle and the rotary motion of the conducting armature, and the amount of such slip depends on the torque load on the armature. For a given torque output, the speed of slip is constant, within a range of speeds of about six to one. Hence the slip results in asynchronous operation as distinguished from synchronous operation without slip, which latter operation is more efficient and desirable for certain purposes involving constant loads.

In another adaptation of the principle of the invention, to a synchronous torque converter, the permanently skewed magnetic bars of the rotor cooperate with the skewable magnetic bars of the stator, which is provided with a ring-shaped field coil establishing a steady magnetic field through the stator and rotor bars in a generally radial direction, but the rotary driven armature in the air gap is composed of circularly-spaced bars of magnetically permeable material and preferably constituting a row of axially-spaced segments lying in axial planes. As the stator bars are skewed relatively to the rotor and armature bars, the rotor causes the flux bundles to move spirally, and that component of this motion, which is normal to the axis of rotation, attracts the magnetically permeable armature bars, thus causing the latter to rotate at a velocity having a definite ratio to that of the rotor, which ratio is variable at will by regulating the relative skew angle between the stator and rotor bars. With this arrangement and the inclusion of conducting bars surrounding the laminae of the outer rotor, asynchronous operation is obtained when the torque output exceeds certain higher values such as occur during acceleration or overload, whilst synchronous operation is obtained at rated torque or less.

It will be seen that very simple, rugged and very flexible asynchronous and synchronous torque converters are provided by controlling the rate and direction of movement of a diagonally moving flux bundle by varying the angle between relatively linearly moving magnetic pole faces having interposed in the air gap between them a movable member responsive to the movement of the flux bundle.

For a more complete understanding of the invention, reference may be had to the accompanying drawings, in which:

Figure 1 is a simplified diagram illustrating the principle of magnetic force and motion transmission of this invention;

Fig. 2 is a partial axial section through one form of asynchronous torque converter embodying the invention, as seen along the line 2—2 of Fig. 3;

Fig. 3 is a transverse section through Fig. 2 as seen along the line 3—3 thereof;

Fig. 6 is a transverse section as seen along the line 6—6 of Fig. 4;

Fig. 7 is an axial section through a combination synchronous and asynchronous form of torque converter embodying the invention, as seen along the line 7—7 of Fig. 8;

Fig. 8 is a transverse section therethrough as seen along the line 8—8 of Fig. 7; and Figs. 9—A to 9—C, inclusive, are diagrams illustrating the operation of the torque converter of Figs. 7 and 8.

Figure 4:
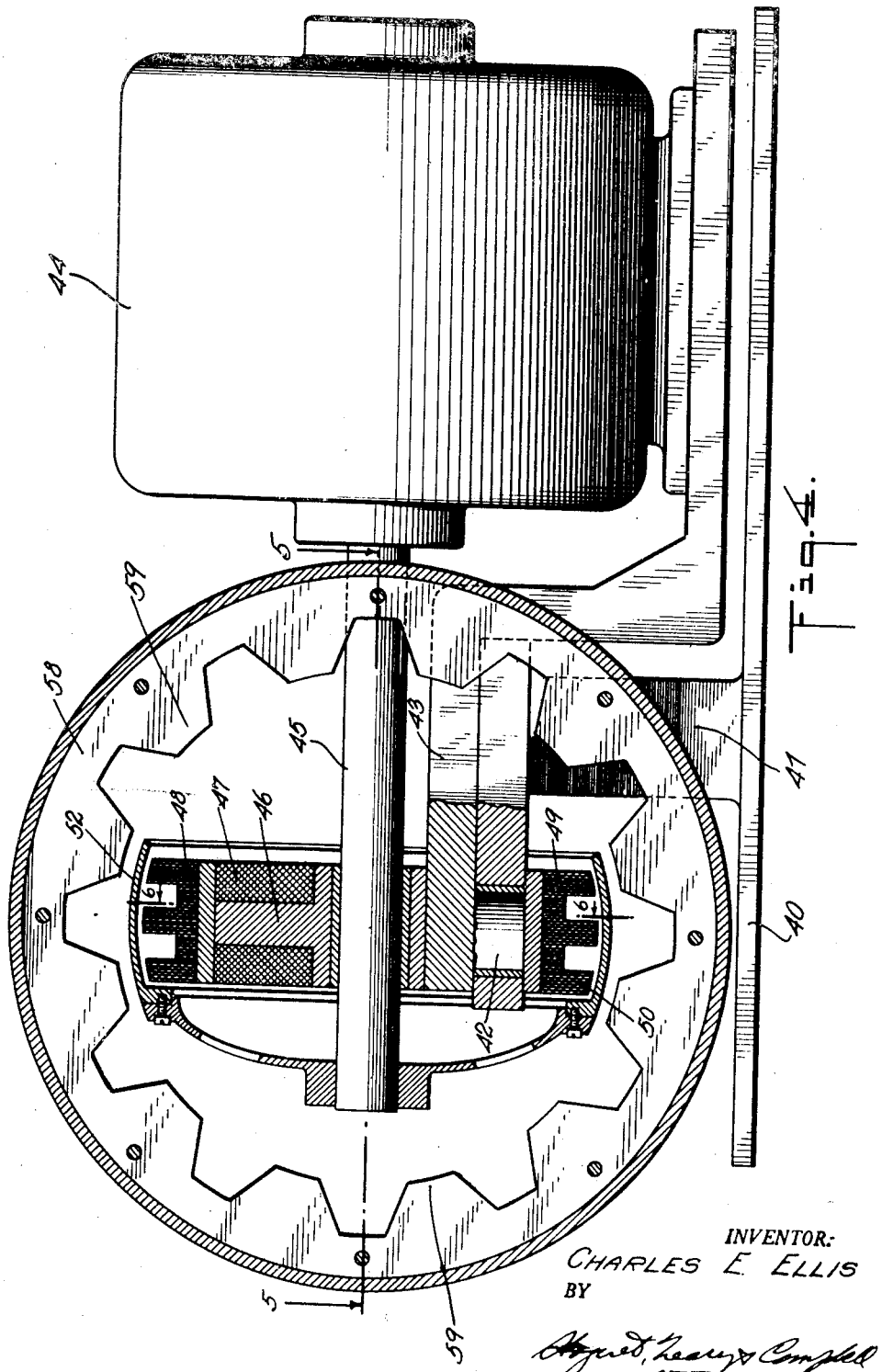
Fig. 4 is an illustration partially in section as seen along the line 4—4 of Fig 5 of another form of asynchronous torque converter embodying the invention.

Referring to Fig. 1 of the drawings, illustrating the basic principle of the invention, numeral 1 designates an elongated fixed pole face, whereas numeral 2 designates a similar pole face with its long axis arranged at an angle $\theta$ to that of pole face 1. Pole face 2 is slightly spaced from pole face 1 in a direction normal to the plane of the drawing, so as to form an air gap between them, and is movable linearly at the angle $\theta$ relatively to fixed pole face 1 in the direction of the arrows, i. e. vertically in the drawing. Both poles are magnetically oppositely charged by suitable external means, not shown, so that they have the opposite polarity shown. Since the path of least magnetic reluctance exists in the air gap between the poles 1 and 2 at the point where they cross each other, the greatest concentration of magnetic flux is at that point, B, and which may be termed a flux "bundle", which is generally diamond-shaped as shown when the angle $\theta$ is less than 90° and square when $\theta$ is 90°, neglecting fringing. The bundle B changes area as well as shape as the angle $\theta$ changes.

It is evident that any relative motion between the pole faces 1 and 2 in planes parallel to the drawing will cause a shift in the location of the flux bundle B with reference to fixed pole 1, except a motion of pole 2 parallel to its own long axis. If the movement of pole 2 relatively to pole 1 is linear while pole 2 is at angle $\theta$, such as vertically downwardly in the direction of the arrows, the flux bundle B shifts to the right along both poles 1 and 2, and the velocity of this shift of the flux bundle B depends upon the angle $\theta$ as well as the absolute velocity of the relative movement between the poles 1 and 2. This may be demonstrated by the velocity triangle BOV, in which vector OV represents the direction and magnitude of motion of the N pole face 2 and vector BV the magnitude and direction of movement of the bundle B along pole face 1 to the right.

If $\theta$ is 5°, then OV = .0875BV since tan 5° = .0875.
If $\theta$ is 30°, then OV = ½ BV since tan 30° = ½.
If $\theta$ is 45°, then OV = 1 BV since tan 45° = 1.
If $\theta$ is 60°, then OV = 2BV since tan 60° = 2.
If $\theta$ is 90°, then OV = $\theta$BV since tan 90° = $\theta$.
If $\theta$ is —30°, then
$$OV = -\tfrac{1}{2} BV \text{ since } \tan -30° = -\tfrac{1}{2}.$$

It is thus evident that if the rate and direction of movement of the moving pole 2 is held constant and the angle $\theta$ changed, there will be a different value of BV for each angle, so that by changing $\theta$ it is possible to control the direction and rate of motion of the flux bundle without altering the speed of motion of the moving pole 2.

By interposing in the air gap between pole faces 1 and 2 a member responsive to movement of the flux bundle B, such as by induced eddy current drag in a non-magnetic, but electrically conducting member, the member may be moved with a torque and at a speed differing from the torque and speed of the moving pole face 2.

An application of this torque and speed conversion function is illustrated in Figs. 2 and 3, in which numeral 10 designates a stationary frame of generally tubular shape having end plates 11 and 12 provided with ventilating openings 13. Journalled in bearings 14 mounted on end plate 11 is a driving shaft 15 on which the rotor 16 is mounted.

Rotor 16 consists of a shaft 17 of magnetic material, divided into two axial sections separated by magnetically permeable space 18 and each section having stacked toothed laminations skewed at an angle to the axial plane, so that the teeth extend spirally, as shown. Thus, closely packed between end plates 20 is a stack of laminations of magnetic material, such as iron, soft steel, or the like. Although these laminations lie in planes normal to the axis of shaft 15, their teeth are progressively displaced longitudinally so that together they form composite magnetic poles 21 which are skewed with respect to the axial plane. The laminations composing poles 21 are concentrically mounted on the rotor core 17 so that the whole is a rotatable unit, having a plurality of parallel poles 21 which preferably are permanently skewed, as shown, in order to enable reversal in rotation within a substantial speed range.

An equal or unequal number of magnetic bars 22 constitutes the stator 23, these bars comprising loose laminations of magnetic material stacked in two spaced groups between stationary guide rings 24. The loose laminations constituting the stator bars 22, are accordingly slidable circularly on the inner surface of tubular frame 10 and are rotated in grouped relation by a twistable but laterally stiff bar or slat 25 passing through the laminations forming bars 22 and elongated slots in fixed rings 24 and pivoted at one end 26 on the frame 10. The other end of each bar or slat 25 passes through a slot in a ring 27 rotatably mounted within frame 10 and provided with a worm sector 28 rotatable by a worm wheel 29 journalled on the frame 10. As ring 27 is rotated by worm 29, slats 25 are deflected about their pivots 26 and thus cause the successive laminations constituting bars 22 to become progressively projected beyond the preceding laminations in a circular direction, whereby the entire bar 22 is skewed relatively to the axial plane, the angle of skew depending on the angle of deflection of the corresponding slats 25.

Positioned in the air gap 30 between the pole faces of stator bars 22 and rotor bars 21, is a tubular armature 31 of non-magnetic electrically conducting material, such as copper, aluminum, bronze, brass or the like, which is journalled on bearing 32 at one end and on bearing 33 on the free end of shaft 15 at the other end. An output or driven shaft 35 is secured to armature 31 and is journalled in bearing 36 mounted in end plate 12, as shown in Fig. 2. The armature 31 is slotted axially at circularly spaced points 31', so that it is, in effect, subdivided into a numerous plurality of axial conducting bars, joined at their ends by connecting rings 31A, 31B and 31C, making a pair of "squirrel cage" members. Magnetic material may be inserted in slots 31' and insulated from armature 31 except at the end rings 31B and 31C, in order to decrease the magnetic reluctance of the structure.

A stationary ring-shaped field coil 37, interposed in the space between the two sections of the stator 22, is energized by a direct current source, not shown, so that a steady magnetic flux circulates through the stator 22 frame 10, air gap 30, armature 31, rotor teeth 21, and rotor spacer 18, as shown by the arrows in Fig. 2. A fan may be mounted on either shaft 15 or 35 to circulate cooling air through the frame 10 and armature 31.

In operation of the torque converter of this invention, as illustrated in Figs. 2 and 3, it will be observed that a stator bar 22 corresponds to fixed pole 1 of Fig. 1, that a corresponding rotor bar 21 corresponds to the movable pole 2 of Fig. 1, that the angle between the permanently skewed rotor bar 21 and the stator bar 22 is the angle θ of Fig. 1, and that this angle may be varied at will by skewing stator bar 22 by deflecting corresponding slats 25 accordingly.

Input shaft 15 is driven by a suitable source of power whose torque is to be converted, such as a motor, not shown. With the stator pole bars 22 unskewed, i. e. lying in axial planes, the flux bundle moves along a stator bar 22 in a straight line parallel to the axis of shaft 15 to the end of the stator bar 22 to reappear simultaneously at the opposite end thereof as the next succeeding rotor bar intersects therewith. The bars 21 of rotor 16 are so spaced and skewed that the leading end of one intersects with the corresponding end of a stator bar 22 as the preceding rotor bar moves out of registry with the other, so that flux across the air gap 30 is of constant magnitude, although it shifts longitudinally along the stator bar. Since such movement of the flux bundle occurs parallel to the slots and bars 31' in the armature 31, no eddy currents are induced in armature 31 and it does not rotate. On the contrary, the flux bundles resist rotation of armature 31.

However, if the stator bars 22 are skewed by deflecting flats 25 in the manner described, the flux bundles move in a spiral path, thus having a rotational component, the magnitude of which depends on the degree of skew of the stator bars 22. Since the flux bundles thus travel spirally with relation to the slots 31' in the armature 31, they cross the conductors between the slots to induce currents therein, which tend to resist the rotational component of the flux bundle motion, thus causing the armature 31 to follow and rotate in step with the rotational component of the flux bundle spiral motion. Because of the difference between the rate of rotation of the rotor 16 and rate of rotation of the rotational component of the flux bundles, a certain amount of slip occurs which depends upon the torque load on the armature shaft 35. For a given torque output, the speed of the slip is constant regardless of the absolute speed, within a speed range of about six to one.

By varying the skew of the bars 22 of stator 23, the torque output may be varied, as described, and also the speed of armature 31 since the rate of movement of the flux bundles depends upon the angle as well as upon the absolute speed. Hence torque and speed conversion are simultaneously provided. Speed may be further regulated by changing the speed of the input shaft 15, and also the slip at any stated torque may be regulated by changing the value of current flowing through coil 37 and hence the intensity of the magnetic fluxes throughout the apparatus. In an alternative arrangement, not susceptible to such magnetic field control, the field coil may be replaced by a permanent magnet.

Figure 5:
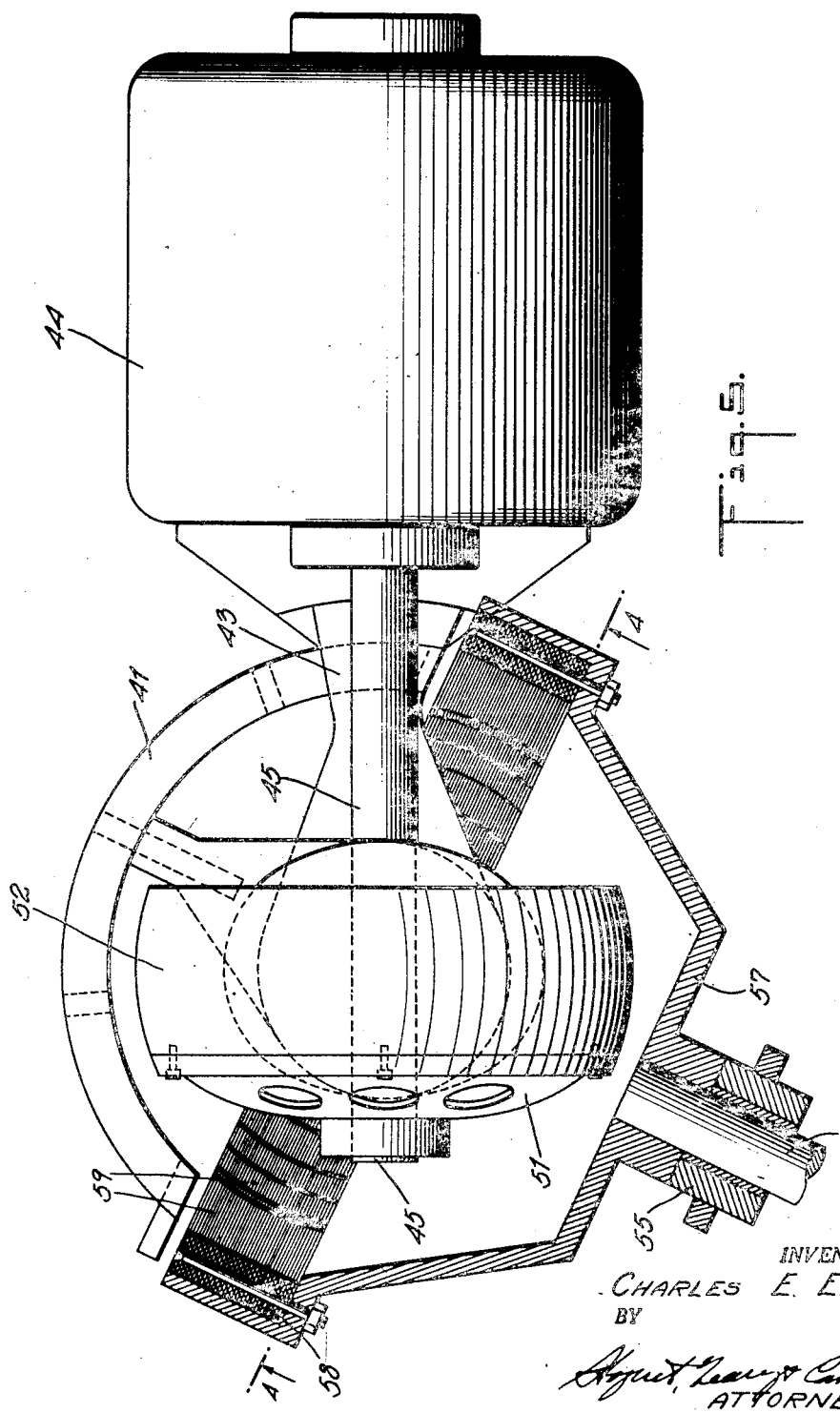
Fig. 5 is a plan view thereof shown partially in axial section as seen along the line 5—5 of Fig. 4.

Another form of asynchronous torque converter embodying the invention is illustrated in Figs. 4, 5 and 6, in which one of the relatively rotatable sets of magnetic bars is skewed bodily with its axis of rotation rather than being skewed relatively to its axis of rotation as in Figs. 2 and 3.

Referring to Figs. 4 and 5, numeral 40 designates a suitable base on which a sector-shaped standard 41 is mounted, having a central opening in which the pivot 42 of a movable frame 43 is journalled as it slides over sector 41. Mounted on the frame 43 is the power input motor 44 whose shaft 45 extends through the magnetically permeable block 46 mounted on frame 41. Block 46 shown in section in Fig. 6 carries a circular field coil 47 energized from a suitable direct current source. Mounted on block 47 are opposite pole shoes 48 and 49 composed of laminations of iron or soft steel and arranged as shown in Figs. 5 and 6. These pole shoes 48 and 49 are subdivided into three bars 50, more or less, which constitute the stationary magnetic poles equivalent to pole faces 1 of Fig. 1.

Secured to the free end of motor shaft 45 is a non-magnetic spider 51 carrying an electrical conducting non-magnetic spherical section 52, such as copper, so shaped that its inner surface has the same center curvature as the curvature of the stationary pole shoes 48 and 49 and spaced therefrom, and whose outer surface is spherical about said center. The entire structure comprising motor 44, input shaft 45, block 46, magnetic bars 48 and spider 51 and conducting section 52 is accordingly movable about pivot 42.

Journalled in bearings 55 is the output shaft 56 fitted with a non-magnetic spider 57 on which is supported a ring 58 composed of iron or soft steel laminations extending normal to the axis of shaft 56 and serrated diagonally so as to provide magnetic bars 59, each corresponding to pole face 2 of Fig. 1. The inner surfaces of bars 59 are spherically concave and spaced from the complementary convex spherical surfaces of bars 50 so as to provide an air gap which is constant regardless of the relative angular positions of input shaft 45 and output shaft 56.

In operation of the asynchronous torque converter illustrated in Figs. 4, 5 and 6, rotation of conducting spherical section 52 by input shaft 45 causes the flux bundles traversing the conducting member 52 from magnetic bars 50 to skewed poles 59 to be distorted by the magnetic field of the eddy currents created in 52 as a consequence of its motion through the flux bundles, thus pulling on poles 59 and causing rotation of member 58 and output shaft 56. By rotating motor 44 bodily about center pivot 42, the angle of skew between bars 50 and 59 changes and varies the rate of movement of the flux bundles and the corresponding rotational component, thus varying the torque and speed of the output shaft 56, according to the above-described principle, the flux path being indicated by the arrows in Fig. 4. It will be observed that there is no component of diagonal flux bundle movement in this case and that inversion of operation is readily effected by making shaft 56 the input shaft and shaft 45 the output shaft.

In the combination synchronous and asynchronous torque converter illustrated in Figs. 7 and 8, the rotor 60, including permanently skewed bars 61, and the stator 62, including bars 63 skewable by pivoted slats 64, are constructed and arranged the same as rotor 16 and stator 22 of Fig. 1, respectively. A field coil 65, like coil 37 of Fig. 1, establishes a circulating flux through the stator bars 63 and rotor bars 61 and across the air-gap 66 between them, as is indicated by the arrows in Fig. 7.

The armature 67 is composed of segments 68 of magnetic material embedded in a non-magnetic electrical conducting cylindrical "squirrel cage" 69 such as copper or brass, the segments being spaced apart and arranged in axial rows resembling bars 70 which are spaced apart circularly the same distance as rotor bars 61 and stator bars 63 as shown in Fig. 8.

Synchronous operation of the torque converter of Figs. 7 and 8 is illustrated diagrammatically in Figs. 9—A to 9—C, inclusive, in which the permanently skewed rotor poles are designated 61, the skewable stator poles 63 and the armature bars 70, as in Figs. 7 and 8. Flux bundles B exist between the stator and rotor bars at points of least reluctance, in the air gap between them. When the stator poles 63 are not skewed, as in Fig. 9—A, the armature bars 70 seek the position which presents their laminations in the path of least magnetic reluctance and hence greatest air gap flux density, and it will resist any force tending to move them from that position, because to so move would take them away from the flux bundles which exert attractive force. Rotation of rotor bars 61 merely results in linear movement of the flux bundles along the unskewed stator poles 63 without rotational components, so that no sustained rotation of the armature takes place.

In order to obtain speed amplification, the poles must be skewed in steps equal to one pole pitch. Thus, if the stator poles 63 are skewed one pole pitch to the right as shown in Fig. 9—B, the flux bundles B move spirally as indicated, as the rotor rotates, so that a rotational component in a plane normal to the axis exists, which causes the armature bars 70 to be attracted and rotated. The rotational movement of armature bar 70 bears a definite relation to the velocity of the rotor bar 61. Hence, as the rotor bar moves a distance equal to three stator pole pitches to right, the flux bundles and consequently the armature move one pole pitch to the left, whereby a speed ratio of 1 to 3½ in a reverse direction, is obtained. Inasmuch as the work performed by the rotor bar 61 in moving 3½ pole pitches must equal the work done by the armature 70 in moving one pole pitch, assuming friction and magnetic hysteresis losses to be zero, the force required to move the armature 70 must be 3½ times that required to move the rotor bars 61, whereby the torque is multiplied 3½ times. By skewing stator poles 63 a greater number of pole pitches to the right, varying torque and speed conversion ratios are obtained.

Fig. 9—C illustrates the condition existing when the stator poles 63 are skewed to the left one pole pitch, thus giving a speed ratio, output to input, of 1 to 5½. Other ratios may be obtained by increasing the skew angle of stator poles 63.

In the torque converter of Figs. 7 and 8 the slip that occurs with the induction type of torque converter of Figs. 2 to 6 does not occur, whereby greater efficiency is obtained in cases of constant loads, and where the rapid acceleration on starting that is characteristic of the asynchronous type, is not required.

If a torque load is imposed on rotor 70 sufficient to break synchronism and to cause rotational slip between rotor 70 and the rotational component of flux bundle motion at that particular setting of 62, currents will be set up in the conducting support bars 67 which will create magnetic fields interacting with the flux bundles tending to force 70 to rotate with the flux bundles in the way described for the asynchronous converter of Figs. 1 to 3. The greater the slip the greater the torque due to induced current action, which supplements the torque due to the synchronous magnetic force exerted on laminations 68, and tends to restore synchronism, which is of value when starting or when changing speeds under load. Furthermore, any tendency of rotor 70 to "hunt" or oscillate about its mean position relative to the flux bundle pattern is damped out by the circulating currents induced in 67 by such "hunting." Another advantage of the composite non-magnetic and magnetic bar structure of the armature 67 is that it provides torque when the converter is operating asynchronously. However, where synchronous operation only is desired, the matrix 69 in which the bars 68 are inserted may be made of non-conducting, non-magnetic material, such as a plastic, for example.

Other forms of the invention may be employed, in which relative movement of the magnetic poles, in parallel planes or about an axis, is always such as to obtain diagonal or biased movement of the flux bundle to the longitudinal axis of one of the poles. Thus the invention is not limited to the embodiments illustrated and described herein, but is susceptible of changes in form and detail within the scope of the appended claims.

I claim:

1. In a torque converter, the combination of a pair of elongated oppositely-charged magnetic pole members having their elongated pole faces arranged at an angle and spaced to form an air gap at their crossing point traversed by flux concentrated at that point, means supporting said members for relative movement in that relation in a linear direction at an angle to the longitudinal axis of one of said members and substantially parallel to said pole faces to cause the flux concentration to move longitudinally of one of said members at an angle to said direction, a third member interposed in said air gap and responsive to movement of said flux concentration, and means supporting said third member for movement relatively to said other members in said linear direction and substantially parallel to said pole faces in response to a component in that direction of the augular movement of said flux concentration.

2. In a torque converter, the combination of a pair of elongated oppositely-charged magnetic pole members, relatively movable means supporting said members with their elongated pole faces arranged at an angle and spaced to form an air gap at their crossing point traversed by flux concentrated at that point, means for relatively moving said members in a linear direction at an angle to the longitudinal axis of at least one of said members and while in said angular spaced relation for moving said flux concentration longitudinally of said members at an angle to said direction, a third member interposed in the air gap between said members and responsive to movement of said flux concentration, and means supporting said third member for movement in said air gap in said direction in response to the component of said direction of the movement of said flux concentration at an angle to said direction.

3. In a torque converter, the combination of a pair of elongated oppositely-charged magnetic pole members having their elongated pole faces arranged at an angle and spaced to form an air gap at their crossing point traversed by flux concentrated at that point, means supporting said members for relative movement in that relation in a linear direction at an angle to the longitudinal axis of at least one of said members and substantially parallel to said pole faces, a third member interposed in said air gap and responsive to movement of said flux concentration, means supporting said third member for movement relatively to said other members in said direction and substantially parallel to said pole faces, means for relatively moving the supporting means of said pair of members in said direction to cause the flux concentration to move longitudinally of one of said pair of members at an angle to said direction for causing the third responsive member to move in said direction in response to a component in that direction of the angular movement of said flux concentration, and means for adjusting the angular relation between said first members to vary the response of said third member to their relative movement.

4. In a torque converter, the combination of a pair of elongated oppositely-charged magnetic pole members, relatively movable means supporting said members with their elongated pole faces arranged at an angle and spaced to form an air gap at their crossing point traversed by flux concentrated at that point, means for relatively moving said members in a linear direction at an angle to the longitudinal axis of at least one of said members and while in said angular spaced relation for moving said flux concentration longitudinally of said members at an angle to said direction, a third member interposed in the air gap between said members and responsive to movement of said flux concentration, means supporting said third member for movement in said air gap in said direction in response to the component of said direction of the movement of said flux concentration at an angle to said direction, and means for adjusting the angular relation between said pair of members to vary the response of the third member to their relative movements.

5. In a torque converter, the combination of a stator, a rotor, an elongated pole member mounted on said stator, an elongated, oppositely-charged pole member mounted on said rotor in spaced relation to said stator member to form an air gap between their pole faces, said members being arranged at an angle to each other to concentrate flux at their crossing point and at least one of them being mounted at an angle to the axial plane of said rotor, a flux-responsive armature rotatable about the rotor axis interposed in said air gap, and means for rotating said rotor to thereby cause the armature to rotate in response to the component normal to the axial plane of the resulting spiral movement of flux concentration as the crossing point of said pole faces travels spirally along said angularly disposed pole member.

6. In a torque converter, the combination of a stator, a rotor, an elongated pole member mounted on said stator, an elongated, oppositely-charged pole member mounted on said rotor in spaced relation to said stator member to form an air gap between their pole faces, said members being arranged at an angle to each other to concentrate flux at their crossing point and at least one of them being mounted at an angle to the axial plane of said rotor, a flux-responsive armature rotatable about the rotor axle interposed in said air gap, means for rotating said rotor to thereby cause the armature to rotate in response to the component normal to the axial plane of the resulting spiral movement of flux concentration as the crossing point of said pole faces travels spirally along said angularly disposed pole member, and means for adjusting the angular relation between said pole members to thereby vary the rotary component of the spirally-moving flux concentration.

7. In a torque converter, the combination of a pair of elongated magnetic pole members having their elongated pole faces arranged at an angle and spaced to form a narrow air gap at their crossing point traversed by flux concentrated at that point, means supporting said members for relative movement in that relation in a linear direction at an angle to the longitudinal axis of at least one of said members and substantially parallel to said pole faces, magnetic field means on at least one of said supporting means for establishing a flux path longitudinally of said members and across said air gap, a third member interposed in said air gap and responsive to movement of said flux concentration, means supporting said third member for movement relatively to said other members in said direction and substantially parallel to said pole faces, and means for relatively moving the supporting means of two of said members in said direction to cause the flux concentration to move longitudinally of one of said first two members at an angle to said direction for causing the other responsive member to move in said direction in response to a component in that direction of the angular movement of said flux concentration.

8. In a torque converter, the combination of a pair of elongated magnetic pole members, relatively movable means supporting said members with their elongated pole faces arranged at an angle and spaced to form a narrow air gap at their crossing point traversed by flux concentrated at that point, magnetic field means on at least one of said supporting means for establishing a flux path longitudinally of said members and across said air gap, means for relatively moving said members in a linear direction at an angle to the longitudinal axis of at least one of said members and while in said angular spaced relation for moving said flux concentration longitudinally of said members at an angle to said direction, a third member interposed in the air gap between said members and responsive to movement of said flux concentration, and means supporting said third member for movement in said air gap in said direction in response to the component of said direction of the movement of said flux concentration at an angle to said direction.

9. In a torque converter, the combination of a stator, a rotor, an elongated pole member mounted on said stator, an elongated pole member mounted on said rotor in spaced relation to said stator member to form an air gap between their pole faces, magnetic field means mounted on said stator for establishing a flux path longitudinally of said members and across the air gap between their pole faces, said members being arranged at an angle to each other to concentrate flux at their crossing point and at least one of them being mounted at an angle to the axial plane of said rotor, a flux-responsive armature rotatable about the rotor axis interposed in said air gap, and means for rotating said rotor to thereby cause the armature to rotate in response to the component normal to the axial plane of the resulting spiral movement of flux concentration as the crossing point of said pole faces travels spirally along said angularly disposed pole member.

10. In a torque converter, the combination of a pair of elongated oppositely-charged magnetic pole members, relatively movable means supporting said members with their elongated pole faces arranged at an angle and spaced to form a narrow air gap at their crossing point traversed by flux concentrated at that point, means for relatively moving said members in a linear direction at an angle to the longitudinal axis of at least one of said members and while in said angular spaced relation for moving said flux concentration longitudinally of said members at an angle to said direction, a third member of non-magnetic conducting material interposed in the air gap between said members and responsive to movement of said flux concentration, and means supporting said third member for movement in said air gap in said direction in response to the component of said direction of the movement of said flux concentration at an angle to said direction.

11. In a torque converter, the combination of a pair of elongated oppositely-charged magnetic pole members, relatively movable means supporting said members with their elongated pole faces arranged at an angle and spaced to form a narrow air gap at their crossing point traversed by flux concentrated at that point, means for relatively moving said members in a linear direction at an angle to the longitudinal axis of at least one of said members and while in said angular spaced relation for moving said flux concentration longitudinally of said members at an angle to said direction, a third member of magnetic material interposed in the air gap between said members and responsive to movement of said flux concentration, and means supporting said third member for movement in said air gap in said direction in response to the component of said direction of the movement of said flux concentration at an angle to said direction.

12. In a torque converter, the combination of a pair of elongated oppositely-charged magnetic pole members having their elongated pole faces arranged at an angle and spaced to form a narrow air gap at their crossing point traversed by flux concentrated at that point, means supporting said members for relative movement in that relation in a linear direction at an angle to the longitudinal axis of at least one of said members and substantially parallel to said pole faces, a third member of non-magnetic conducting material interposed in said air gap and responsive to movement of said flux concentration, means supporting said third member for movement relatively to said other members in said direction and substantially parallel to said pole faces, and means for relatively moving the supporting means of two of said members in said direction to cause the flux concentration to move longitudinally of one of said first two members at an angle to said direction for causing the other responsive member to move in said direction in response to a component in that direction of the angular movement of said flux concentration.

13. In a torque converter, the combination of a pair of elongated oppositely-charged magnetic pole members having their elongated pole faces arranged at an angle and spaced to form a narrow air gap at their crossing point traversed by flux concentrated at that point, means supporting said members for relative movement in that relation in a linear direction at an angle to the longitudinal axis of at least one of said members and substantially parallel to said pole faces, a third member of magnetic material interposed in said air gap and responsive to movement of said flux concentration, means supporting said third member for movement relatively to said other members in said direction and substantially parallel to said pole faces, and means for relatively moving the supporting means of two of said members in said direction to cause the flux concentration to move longitudinally of one of said first two members at an angle to said direction for causing the other responsive member to move in said direction in response to a component in that direction of the angular movement of said flux concentration.

14. In a torque converter, the combination of a stator, a rotor, a plurality of elongated magnetic pole members arranged substantially axially on said stator and rotor, the stator and rotor members being spaced radially to provide an air gap between them, means for variably skewing the stator members relatively to the axial plane, to cause them to cross the corresponding rotor members, an energized field winding mounted on said stator establishing a flux path longitudinally of said stator and rotor members and concentrated in the air gap between them at their crossing points, an armature of magnetic material interposed in the air gap and rotatable about the rotor axis, and means for rotating said rotor to cause the flux concentration to move spirally around said stator and effect rotation of said armature by the component of said spiral flux movement normal to the plane of rotation.

15. In a torque converter, the combination of a stator, a rotor, a plurality of elongated magnetic pole members arranged substantially axially on said stator and rotor, the stator and rotor members being spaced radially to provide an air gap between them, means for variably skewing the stator members relatively to the axial plane, to cause them to cross the corresponding rotor members, an energized field winding mounted on said stator establishing a flux path longitudinally of said stator and rotor members and concentrated in the air gap between them at their crossing points, an armature of spaced axial bars of non-magnetic conducting material interposed in the air gap and rotatable about the rotor axis, and means for rotating said rotor to cause the flux concentration to move spirally around said stator and effect rotation of said armature by the component of said spiral flux movement imposed upon the armature bars in a direction normal to the plane of rotation.

16. In a torque converter, the combination of a stator, a rotor, a plurality of elongated magnetic pole members arranged substantially axially on said stator and rotor, the stator and rotor members being spaced radially to provide an air gap between them, means for variably skewing the stator members relatively to the axial plane, to cause them to cross the corresponding rotor members, an energized field winding mounted on said stator establishing a flux path longitudinally of said stator and rotor members and concentrated in the air gap between them at their crossing points, an armature of axially spaced segments of magnetic material arranged in substantially axial rows and interposed in the air gap and rotatable about the rotor axis, and means for rotating said rotor to cause the flux concentration to move spirally around said stator and effect rotation of said armature by the component of said spiral flux movement attracting said armature segments in a direction normal to the plane of rotation.

17. In a torque converter, the combination of a stator, a rotor, a plurality of elongated magnetic pole members arranged substantially axially on said stator and rotor, the stator and rotor members being spaced radially to provide an air gap between them, said stator members comprising stacks of relatively movable laminations arranged in planes normal to the rotor axis, means extending substantially parallel to said axis and connected to said stator laminations for variably skewing the stator members relatively to the axial plane to cause them to cross the corresponding rotor members, an energized field winding mounted on said stator establishing a flux path longitudinally of said stator and rotor members and concentrated in the air gap between them at their crossing points, an armature of magnetic material interposed in the air gap and rotatable about the rotor axis, and means for rotating said rotor to cause the flux concentration to move spirally around said stator and effect rotation of said armature by the component of said spiral flux movement normal to the plane of rotation.

18. In a torque converter, the combination of a stator, a rotor, a plurality of elongated magnetic pole members arranged substantially axially on said stator and pivoted at one end thereon, a plurality of elongated magnetic members arranged in substantially parallel relation on said rotor whereby the individual rotor and stator bars cross each other at an angle, the stator and rotor members being spaced radially to provide an air gap between them, means for variably skewing the stator members relatively to the axial plane, to cause them to vary the angle at which they cross the corresponding rotor members, an energized field winding mounted on said stator establishing a flux path longitudinally of said stator and rotor members and concentrated in the air gap between them at their crossing points, an armature of substantially parallel bars of conducting material interposed in the air gap and rotatable about the rotor axis, and means for rotating said rotor to cause the flux concentration to move angularly around said stator and effect rotation of said armature by the component of said angular flux movement normal to the plane of rotation.

19. In a torque converter, the combination of a stator comprising a plurality of elongated axial magnetic bars arranged circularly in substantially axial parallel relation about an axis, a rotor encircling said stator comprising a plurality of elongated magnetic bars arranged circularly in substantially parallel relation about an axis arranged at an angle to said stator axis whereby said stator and rotor bars cross, said stator and rotor bars being spaced to provide a circular air gap, an armature arranged circularly about the axis of rotation of said stator and positioned in said air gap, an energized field winding mounted on said stator establishing a flux path longitudinally of said stator and rotor bars and concentrated in the air gap between them at their crossing points, means for rotating said armature to cause the concentrated flux in the air gap to move angularly relatively to said stator axis and effect rotation of said rotor by the component of said angular flux movement, and means for relatively moving said rotor and stator axes to change the angle between said stator and rotor bars.

20. A torque converter comprising at least one pair of elongated, oppositely-charged magnetic pole members having elongated pole-faces spaced apart to form an air gap therebetween, means for adjusting said pole members angularly to produce a concentration of magnetic flux between said pole faces, means supporting said pole members for relative movement while maintaining the spacing between said members substantially constant, a third member formed of electrically-conductive material in the path of magnetic flux between said pole members and movable relatively to said pole members, and means for moving at least one of said members to cause movement of one of the remaining members.

CHARLES E. ELLIS.

REFERENCES CITED

The following references are of record in the file of this patent:

UNITED STATES PATENTS

| Number | Name | Date |
|---|---|---|
| 1,171,351 | Neuland | Feb. 8, 1916 |
| 1,559,920 | Stewart | Nov. 3, 1925 |
| 1,894,979 | Chubb | Jan. 24, 1933 |
| 1,948,546 | Spencer | Feb. 27, 1934 |
| 2,068,820 | Sarazin | Jan. 26, 1937 |
| 2,071,943 | Frazer | Feb. 23, 1937 |
| 2,289,330 | Fischer et al. | July 7, 1942 |

FOREIGN PATENTS

| Number | Country | Date |
|---|---|---|
| 212,598 | Germany | Aug. 3, 1909 |

Certificate of Correction

Patent No. 2,490,789 December 13, 1949

CHARLES E. ELLIS

It is hereby certified that error appears in the printed specification of the above numbered patent requiring correction as follows:

Column 9, line 27, for "augular" read *angular*;

and that the said Letters Patent should be read with this correction therein that the same may conform to the record of the case in the Patent Office.

Signed and sealed this 6th day of June, A. D. 1950.

[SEAL]

THOMAS F. MURPHY,
*Assistant Commissioner of Patents.*